Dec. 29, 1936.  J. L. BARR  2,065,958
PARKING DEVICE
Original Filed Sept. 8, 1930    4 Sheets-Sheet 1
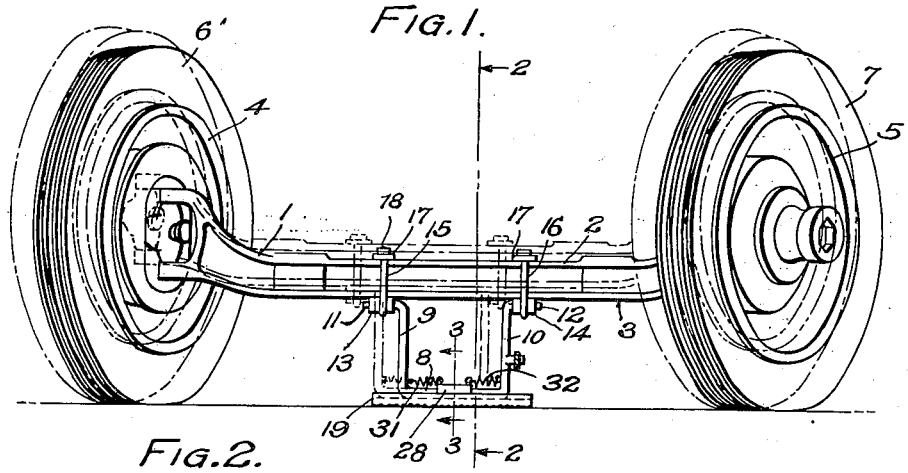
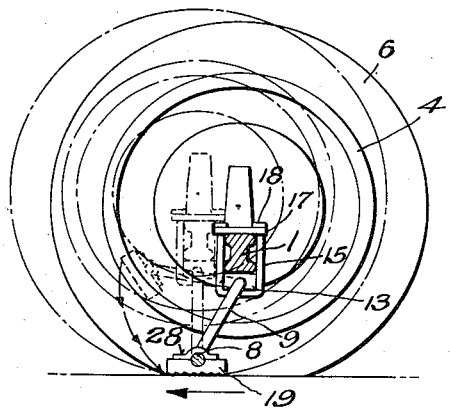
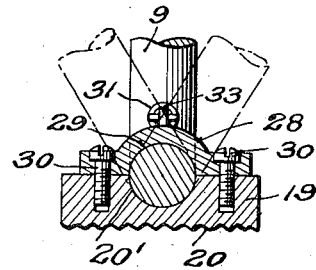
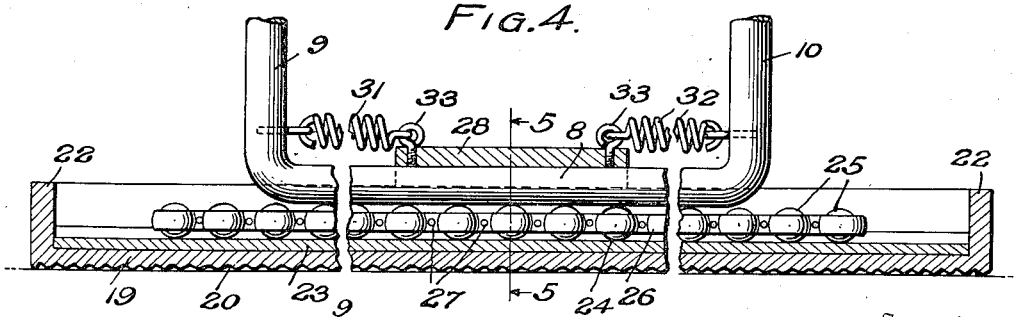
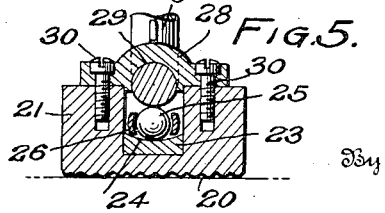
Inventor
JOHN L. BARR,
By Semmes & Semmes
Attorneys

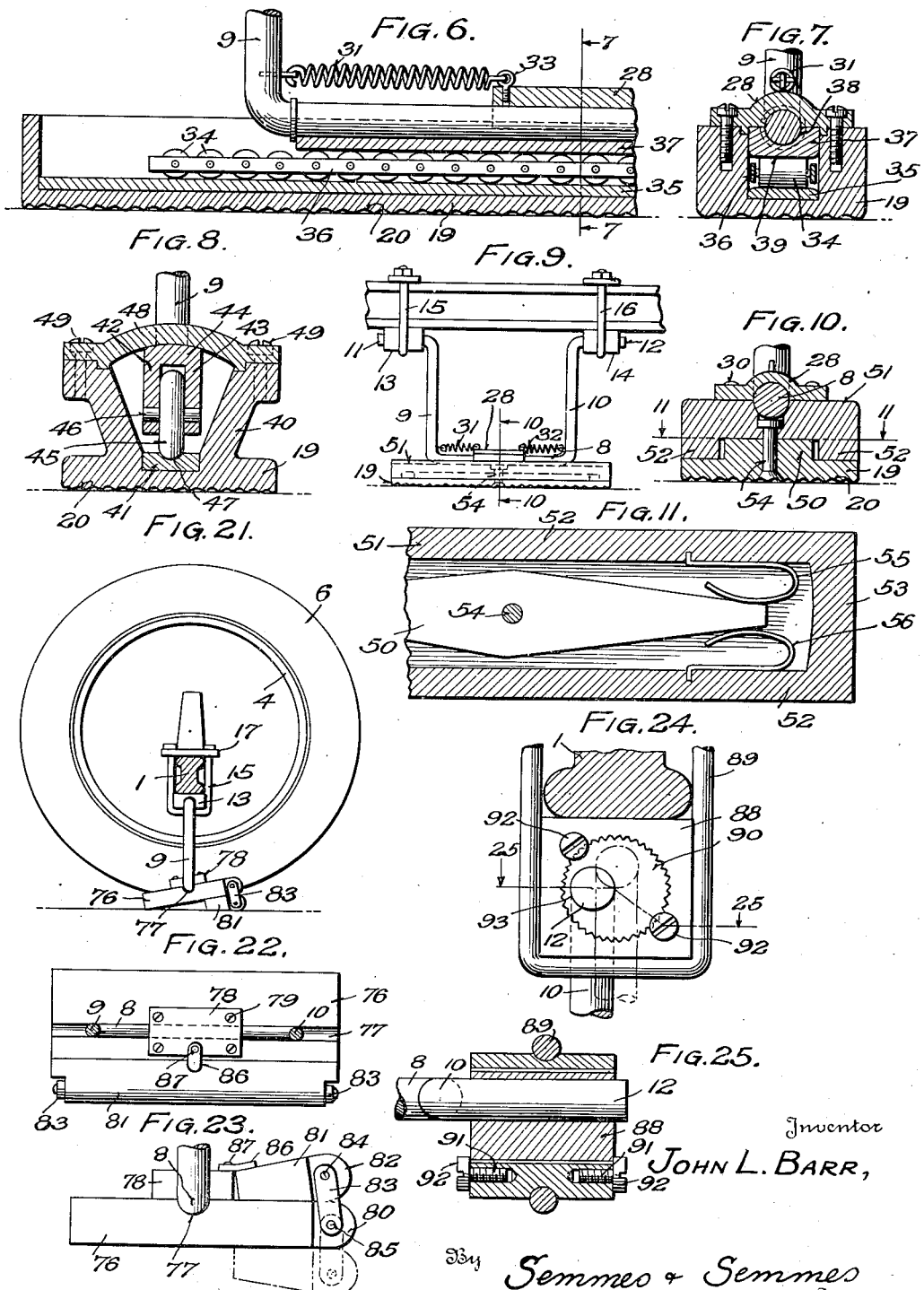
Dec. 29, 1936. J. L. BARR 2,065,958
PARKING DEVICE
Original Filed Sept. 8, 1930 4 Sheets—Sheet 2
Inventor
JOHN L. BARR,
By Semmes & Semmes
Attorneys Dec. 29, 1936.  J. L. BARR  2,065,958
PARKING DEVICE
Original Filed Sept. 8, 1930   4 Sheets-Sheet 3
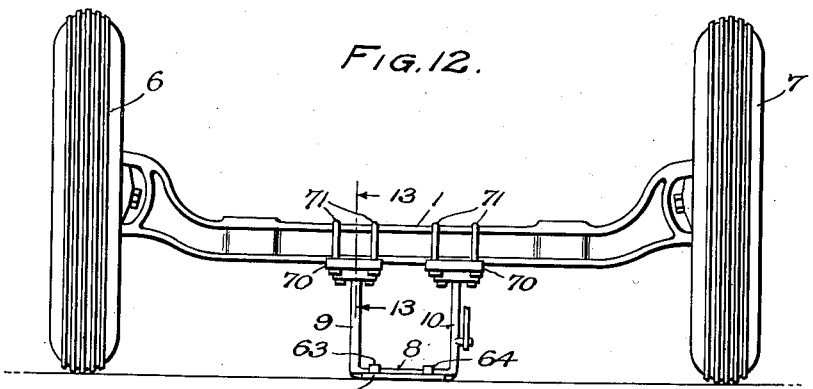
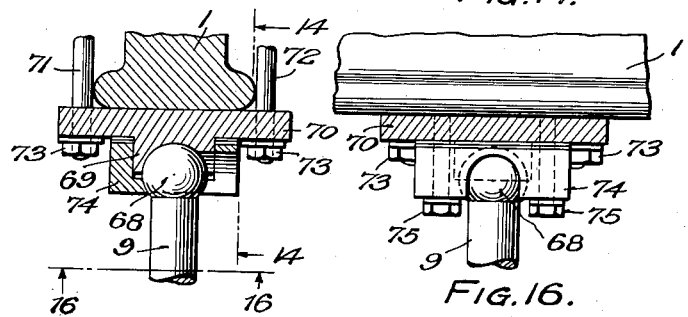
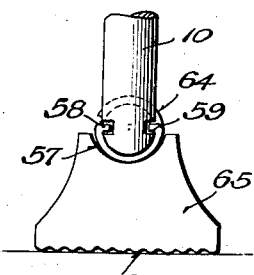
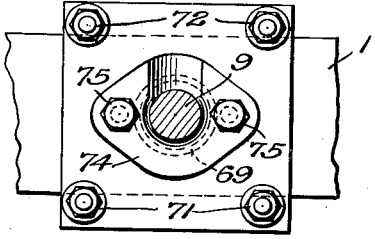
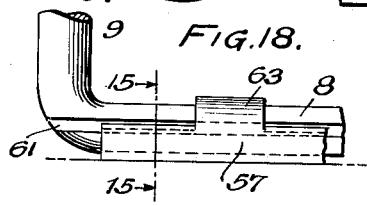
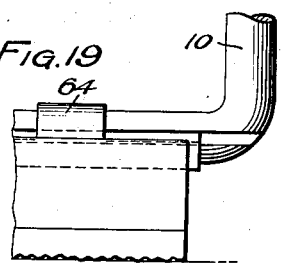
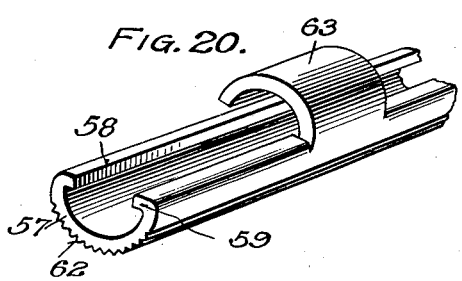
Inventor
JOHN L. BARR,
By Semmes & Semmes
Attorneys

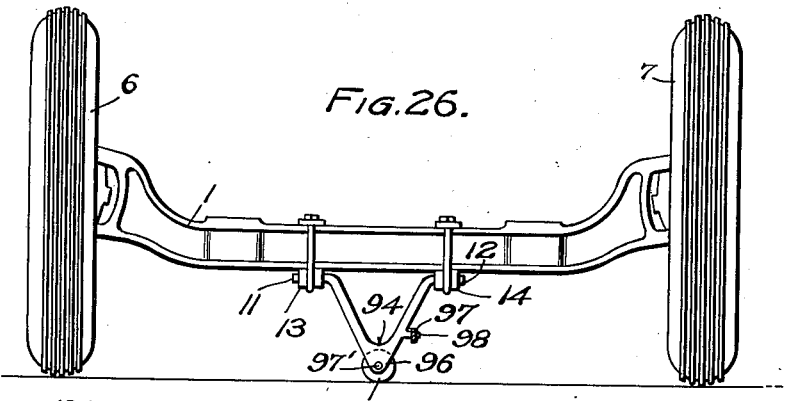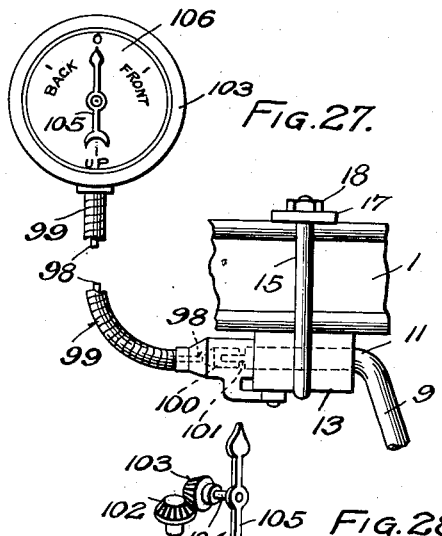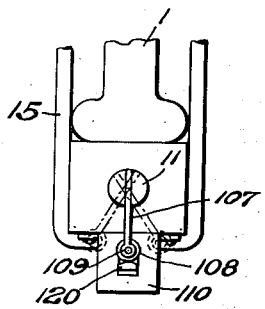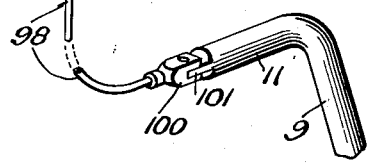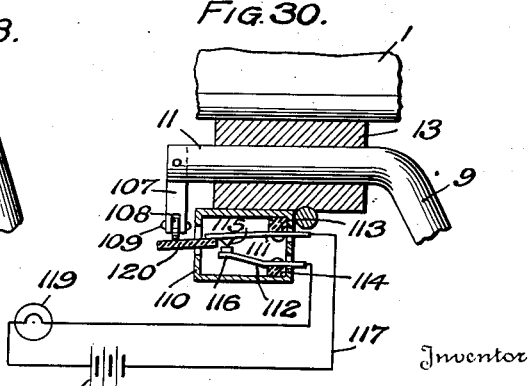

Patented Dec. 29, 1936

2,065,958

UNITED STATES PATENT OFFICE 2,065,958

PARKING DEVICE

John L. Barr, Chevy Chase, Md.

Original application September 8, 1930, Serial No. 480,511. Divided and this application June 9, 1934, Serial No. 729,867

6 Claims. (Cl. 280—150)

This invention relates in general to a lifting device and more particularly has reference to an apparatus for relieving the weight on the steering wheels of a vehicle to facilitate turning of the same.

This application is a division of my copending application Serial No. 480,511, filed September 8, 1930.

In the past, as is fully set forth in my application aforementioned, difficulty has often been experienced in attempting to turn the steering wheels of a vehicle when the vehicle is at, or nearly at, rest; for example, in maneuvering a vehicle in a confined area, such as a parking space.

The device shown in my first application consists essentially of a support mounted under the end of the vehicle carried by the steering wheels. In operation it is intended that the end of the vehicle on which the support is mounted be elevated by driving the vehicle upon the support in either direction, that is either by backward or forward movement of the vehicle. In this manner the weight on the steering wheels is relieved to permit easy turning of the same by decreasing the frictional contact with the roadbed. The support is preferably dimensioned to extend below the radius of the steering wheels, but not below the periphery of the tires when fully inflated, as I have found that it is not necessary to lift the tires completely off the roadbed in order to provide for an easier turning of the steering wheels, although, of course, the support can be of such length as to lift the tires completely off the roadbead if it is so desired.

In my subsequent applications I have shown wheels mounted on the bottom of the support to allow for sidewise movement of the end of the vehicle having a support mounted thereon, to facilitate parking of the same, mechanisms for driving such wheels, and various expedients for mounting and operating the support including various modified forms of supports.

I have found in practice that in the use of these supports that a twisting effect is exerted upon the same, to compensate for which I have devised certain improvements to be later described and claimed herein. A support of this character also often has a tendency to slide sideways and thus exert a strain on the mounting, as well as to dig into and mar the roadbed upon which the support is placed. I show in this application, as will be later seen, modified structures to compensate for such sidewise movement, and also show various other forms of modified structures including improvements over my original disclosures in the mounting of the support, its operation, the support structure, and other uses to which it may be put, for example, in the use of the same as a jack.

It is an object of this invention to provide a support for relieving the weight on the steering wheels of a vehicle to facilitate turning of the same, in which the twisting effect exerted by elevation of the vehicle thereon is compensated for.

Another object of this invention is to provide a support for relieving the weight on the steering wheels of the vehicle to facilitate turning thereof in which the sidewise movement often resulting in the elevation of the vehicle thereon is compensated for.

Still another object of this invention is to provide a support for relieving the weight on the steering wheels of a vehicle to facilitate turning of the same in which the mounting of the support is such as makes the same susceptible for use as a jack, whereby the wheels may be lifted off of the roadbed.

A still further object of this invention is to provide a support for relieving the weight on the steering wheels of a vehicle to facilitate turning of the same in which a supplemental member is carried on the support which may be adjusted for use as a jack, whereby the wheels may be lifted completely off of the roadbed.

A further object of this invention is to provide a support for relieving the weight on the steering wheels of a vehicle to facilitate turning of the same, mounted across each side of the longitudinal axis thereof, and resting on a point in a plane with the longitudinal axis of the vehicle.

A still further object of this invention is to provide a mechanism for indicating the position of a support, for relieving the weight on the steering wheels of a vehicle to facilitate turning of the same.

A still further object of this invention is to provide an attachment for a support for relieving the weight on the steering wheels of a vehicle to facilitate turning of the same, and adapted for use as a jack.

With these and other objects in view which may be incident to my improvements, the invention consists in the parts and combination to be hereinafter set forth and claimed, with the understanding that the several necessary elements comprising my invention may be varied in construction, proportions and arrangement without departing from the spirit and scope of the appended claims.

In the drawings forming a part of this specification:

Figure 1 is a perspective view partly in plan showing a support having a bottom attachment capable of compensating for sidewise movement of the support, on the elevation of one end of a vehicle thereon, showing the weight of the vehicle on the steering wheels relieved.

Figure 2 is a side view taken on line 2—2 of Figure 1.

Figure 3 is a side view partly in section and plan taken on line 3—3 of Figure 1.

Figure 4 is a front sectional view of the attachment for compensating for sidewise movement of the support.

Figure 5 is a side sectional view taken on line 5—5 of Figure 4.

Figure 6 is a sectional view partly broken away showing another form of bottom attachment.

Figure 7 is a side sectional view taken on line 7—7 of Figure 6.

Figure 8 is a side sectional view of another form of bottom member.

Figure 9 is a front view partly in plan showing an attachment for the support adapted to compensate for any twisting effect exerted thereon by elevation of one end of a vehicle on the support.

Figure 10 is a sectional view taken on line 10—10 of Figure 9.

Figure 11 is a sectional view taken on line 11—11 of Figure 10.

Figure 12 is a front view showing a bottom attachment providing for sidewise movement and mounted to provide for twisting movement of the support.

Figure 13 is a sectional view taken on line 13—13 of Figure 12.

Figure 14 is a front view partly in plane taken on line 14—14 of Figure 12.

Figure 15 is a sectional view taken on line 15—15 of Figure 18.

Figure 16 is a bottom view partly in plane taken on line 16—16 of Figure 13.

Figure 17 is an end view mounted on a jack attachment.

Figure 18 is a front fragmentary view of a part of a support with attachment as shown in Figure 12.

Figure 19 is a front view of the support with attachment as shown in Figure 12 resting on a jack block.

Figure 20 is a perspective view of the sliding bottom attachment for the support.

Figure 21 is a side view partly in section of a permanent jack attachment.

Figure 22 is a top view of the jack attachment.

Figure 23 is a side view partly in plane showing the operation of the jack attachment.

Figure 24 is a side view of an extensible mounting for the support.

Figure 25 is a sectional view taken on line 25—25 of Figure 24.

Figure 26 is a front view of a modified form of support.

Figure 27 is a front fragmentary view of a mechanical device for indicating the position of the support.

Figure 28 is a perspective view of the operating mechanism of the indicator.

Figure 29 is an end view of an electrical indicating mechanism.

Figure 30 is a front fragmentary view partly in section of the electrical indicator.

In order to make my invention more clearly understood I have shown in the accompanying drawings means for carrying the same into practical effect without limiting the improvements in their useful applications to the particular constructions, which, for the purpose of explanation have been made the subject of illustration.

Referring more particularly by numerals to the drawings, in which the same and similar elements are designated by like symbols of reference throughout, and more especially to Figure 1, there is shown a vehicle axle 1, having top and bottom flanges 2 and 3, respectively. A pair of steering wheels 4 and 5 are mounted on the ends of the axle 1 in the usual manner. The usual tires 6 and 7, mounted on the steering wheels 4 and 5, are shown fully inflated.

A support comprising a transverse bottom portion 8 and upright legs 9 and 10 turned over at the ends as at 11 and 12, is mounted on the axle on each side of the longitudinal axis of the vehicle, with the bottom portion extending over on each side at a point in a plane therewith. The support is shown with the turned over portions 11 and 12 fitted in apertures provided in blocks 13 and 14 mounted on the under side of the axle and secured thereto by clamps 15 and 16 passing around the blocks, and fixed on the top of the axle by straps 17 and nuts 18 screwed on the ends of the clamps. The present invention is in no wise restricted to the form of support or mounting thereof, as both are susceptible to wide modifications as will be noted with reference to my prior applications, as well as herein. In my present invention any support capable of operation to relieve the weight on the steering wheels of a vehicle to facilitate turning thereof and having a contact portion for resting on a roadbed, will suffice.

In the use of the support of the character described, it has been found that when the end of a vehicle is elevated upon the same that a twisting effect is sometimes exerted by reason of an angular disposition of the steering wheels prior to riding up on the support. Also, such a support will often be found to have a tendency to slide sideways, in many instances injuring the surface upon which it is resting. To overcome these difficulties, I have devised an attachment adapted to form a part of the support to compensate for such movement, normally resulting from the operation thereof. Such attachments may also be formed to supplement the gripping effect previously provided by the contact portions of the support in an increase in the surface area thereof which may be knurled, in addition, to prevent slipping.

One form of attachment to compensate for sliding movement of the elevated end of a vehicle on the elevation of one end thereof on a support is shown in Figures 1, 2 and 3, inclusive. This attachment consists of a base 19 knurled on the under face 20, formed with a central longitudinal depression 20' adapted to receive the transverse bottom portion 8 of the support. The member 8 is fixed on the attachment by a strap 28 secured on the base 19 by bolts 30, formed with a raised portion 29 adapted to accommodate the top of the transverse member 8 mounted for rotation therein.

In Figures 1 and 2 the support is shown as downwardly positioned with the steering wheels angularly positioned. On elevation of the end of the vehicle onto the support with the wheels thus positioned, the end of the vehicle will have a tendency to move sidewise as shown in plan. This movement is compensated for by allowing the support to move with respect to the contact portion of the attachment which remains fixed on the road surface, and thus allowing compensation for moving the end of the vehicle without a strain on the support or marring of the road surface. In this connection it will be observed that with slight modification, the attachment may be mounted on the underside of the axle, rather than on the bottom of the support, and the support carried thereon, so that the attachment will move relative to the support rather than the support relative to the attachment.

The support is centered with respect to the attachment through spiral springs 31 and 32 connected between each of the upright legs 9 and 10, and the ends of straps 28 through eyes 33.

Another form of attachment is adapted to compensate for sliding movement of the vehicle, as shown in Figures 4 and 5. The attachment shown in Figures 4 and 5 consists of a bottom member 19 knurled as at 20 on the under face, and provided with side and end walls 21 and 22 preferably formed integral therewith. A wear strap 23 is seated in the bottom of the aperture formed by the sides, and is provided with a groove on the top as at 24 adapted to receive a plurality of ball bearings 25 longitudinally arranged in a ball race 26 connected at points intermediate the balls at 27. The bottom of the transverse member 8 of the support is adapted to rest on the top of the balls and is held to the bottom member 19 by a strap 28 formed with a raised portion 29 to receive the top of the transverse member 8, and fixed to the side walls of the bottom 19 by bolts 30. The transverse member 8 is centered with respect to the bottom member by springs 31 and 32 connected between the respective legs 9 and 10 of the support and strap 28, by eyes 33 fixed therein.

It will be seen that in the use of this attachment if the contact portion thereof is rested on an incline, that the support may slide relative thereto and thus relieve any strain which might otherwise be put thereon, and also prevent marring of the surface on which the support is rested, as the contact portion of the support remains stationary.

Another modification of the attachment also adapted to compensate for sliding movement of the vehicle is shown in Figures 6 and 7 in which roller bearings 34 are substituted for the ball bearings shown in Figures 4 and 5. In this construction the wear member 23, shown in Figures 4 and 5 with a longitudinal groove 24, is formed with a flat face 35, and the straps fixing the position of the rollers are longitudinally arranged and secured together by axles 36 passing through the rollers. In this construction an additional wear plate 37 having a longitudinal groove 38 for receiving the bottom portion of the transverse bar 8 of the support, and a flat bottom face 39 is interposed between the rollers and the bottom portion 8.

In Figure 8 is shown still another form of attachment for the support adapted to provide for sliding movement of the vehicle. This attachment consists of a bottom portion 19 knurled as at 20, provided with upwardly extending angularly disposed integral side walls 40 having a wear plate 41 seated therebetween. For the bottom 8 of the support, normally formed integral with the uprights 9 and 10, there is substituted a pair of spaced parallel bars 42 and 43 connected at the top between integral cross piece 44 adapted to receive the legs or uprights 9 and 10 of the support.

One or a plurality of rollers 45 are mounted between the bars 42 and 43, adapted to operate on the wear plate 41, and held between the bars by axles 46 fitted in corresponding apertures provided therein. The rollers having a grooved periphery are adapted to fit in a longitudinal groove 47 provided in the wear plate 41 and held therein by a strap 48 fitted over the integral cross piece 44 and connected at each end to tops of the angularly disposed side walls 40 by bolts 49, and thus sidewise movement of the support is allowed with respect to the attachment, limited by the width of the strap 48 and the distance between the uprights or legs 9 and 10.

The constructions thus far described are, as has been explained, adapted to compensate for sidewise movement of the support when one end of the vehicle is elevated upon the same. As has already been mentioned, a twisting of the support is also liable to result which may strain the mounting thereof and often mars the surface upon which the support is resting. In Figures 9, 10 and 11 is shown a form of attachment for compensating for the twisting movement of the support as well as the sidewise movement thereof. In connection with this attachment particular attention is directed to that shown in Figure 3 already described with reference to compensating for sidewise movement of the support. In this construction the bottom plate of the attachment 19, serrated as at 20, is formed with an integral top piece 50, substantially diamond-shaped as shown in Figure 11, the point of greatest width being the transverse axis across the center thereof, the same gradually tapering toward the ends.

The plate 51 having integral downwardly extending side and end walls 52 and 53, coextensive with the bottom plate 19 is fitted thereon over the integral diamond-shaped member 50, the side and end walls of the plate 51 being of substantially the same thickness as the member 50 on the bottom plate. The bottom and top plates 50 and 51 are connected by a pivot pin 54 extending through registering apertures provided in the centers thereof. It will thus be seen that relative rotation between the top and bottom plates is allowed within the limits of the distance between the ends of the member 50 and the side walls of the top plate 51. The plates are normally held centered by oppositely acting leaf springs 55 and 56 anchored in the side walls and interposed between the member 50 and the side walls, relative rotation between the plates being against the force exerted by one or the other of the pairs of springs.

The bottom 8 of the support is fitted in a longitudinal groove provided in the top of the plate 51 and held therein for supplying movement with respect thereto by the strap 28 fixed by bolts 30, in the same manner as shown in Figure 3, the bottom of the support normally being held in a central position with respect to the plate 51 by spring members connected between the strap and the legs 9 and 10 of the support. Manifestly the form of attachment to compensate for twisting movement of the support as shown in Figures 9, 10 and 11 and described in conjunction with that to compensate for supplying movement shown in Figure 3, is adaptable to the other forms of attachment to compensate for supplying movement of the support shown in Figures 4, 6, and 8.

The operation of the support having any of the forms of attachment described fixed thereon will be readily understood with reference to Figures 1 and 2, wherein the form of attachment shown in Figure 3 is mounted on the under side of the vehicle axle having the ends journaled in the steering wheels. It will be appreciated that if the support is lowered onto a level surface, and the steering wheels are longitudinally positioned with respect to the driving wheels that the support will not have any appreciable tendency to move sidewise when the front end of the vehicle is elevated thereon.

If the steering wheels are angularly positioned or if resting on a curved surface such as forms the crown of many roadways, the end of the vehicle, on elevation may have a tendency to move sidewise. Such sidewise movement obviously subjects a support fixed against sidewise movement, to considerable strain, tending to damage the support or mar the road surface upon which it is rested. To avoid such strains I have devised relatively slidable members on the support already particularly described. These movable devices constitute improvements over the transversely arranged rollers shown mounted on the bottom of my support in certain of my prior copending applications aforementioned.

When the steering wheels are resting on the road surface, the weight of the vehicle distorts the configuration of the tires so that a greater friction surface is presented than where the bottoms of the tires are relieved of weight. In driving up on the support, the weight of the vehicle on the tires is not instantly but gradually relieved, that is, while the tires tend to assume their normal configuration as the end of the vehicle is elevated, the same, nevertheless, retain friction contact with the road surface until fully elevated. It will be apparent, therefore, that if the steering wheels are positioned at an angle, on driving the back wheels the front of the vehicle will tend to turn until the front wheels lose traction, by being raised out of contact with the road surface. This results in the sidewise and often twisting movement of the support, which, if provided with a rigid bottom, would tend to strain the structure or mounting as well as mar the surface upon which it is resting.

It will not be necessary, however, that the tires be actually out of contact with the road surface. In fact, where the support is used for the sole purpose of facilitating the turning of the steering wheels, it is deemed advisable to construct the support of such a length that the wheels will not be fully elevated. Thus, without entirely relieving the frictional contact with the road surface, a sufficiently easy turning of the wheels is made possible, and less effort is required to raise the end of the vehicle this lesser amount, and a more secure initial gripping of the support on the road surface is obtained than if the support is constructed of greater length to allow complete elevation of the tires out of contact with the road surface.

In connection with the different forms of attachments to compensate for sliding and twisting movement of the elevated end of a vehicle on elevation of one end thereof on a support, it will be appreciated that with minor changes both of the two forms may be readily combined to provide for an attachment capable of compensation for both sliding and twisting movement of the end of a vehicle on elevation thereof.

The type of attachment shown in Figures 4 and 6 may be varied as shown in Figure 12, and a simplified tubular member 57 substituted therefor. The top of the member 57 is cut away, as shown in Figure 20, and the ends turned over as at 58 and 59, the turned over ends being adapted to slide in grooves 60 and 61, as shown in Figure 15, provided on each side of the base portion 8 of the support. The tubular member may be knurled, as at 62, on the bottom to aid in gripping the surface upon which it is resting, as shown in Figure 20, and is provided with a pair of straps 63 and 64 spaced from the center and fastened to member 57, or made integral therewith, with one edge thereof adapted to fit over the base portion 8 of the support and prevent the tubular member 57 from sliding off the same, as shown in Figure 18, by the straps 63 and 64 coming in contact with the legs or uprights 9 and 10 of the support.

The support may be nested on a block 65 as shown in Figure 19, and having the bottom knurled as at 66, in a groove 67, as shown in Figure 17, to aid in gripping the surface upon which it is supported, the member 65 being adapted to add to the length of the support so that the steering wheels of a vehicle may be fully elevated thereon and the support in conjunction with the block adapted to function as a jack in connection with the sliding attachment 57, shown in Figure 12; block 65 may be dimensioned to accommodate the same, as shown in Figure 17, so as to act in conjunction therewith to fully elevate one end of a vehicle.

In the various types of supports illustrated it will be apparent that the support may be constructed to be vertically lengthened such as by being provided with telescoping legs or being constructed otherwise, capable of vertical extension. In this manner the support may be shortened in the event of a flat tire, in order to elevate the end of a vehicle thereon and lengthened while supporting the end of the vehicle so as to act as a jack and raise the wheels completely off of the road bed.

In mounting the support on the other side of the vehicle axle, the clamps shown in Figure 1 may be dispensed with and another form of mounting, such for example as shown in Figures 12, 13, 14, and 16 substituted therefor if found desirable. In this construction the turned over ends 11 and 12 of the legs or uprights 9 and 10 are formed as balls 68, as shown in Figure 13, integral with the ends of the legs, adapted to fit in sockets provided in projection 69 on plates 70 fixed to the underside of the vehicle axle by straps 71 and 72 fitting over the axle with the open ends extending through the apertures provided in the plates, and held by nuts 73 screwed thereon. The balls 68, as shown in Figure 14, are held in the sockets by caps 74 shown in Figures 13, 14 and 15 provided with apertures and slots to receive the balls and legs, respectively, and fixed on the underside of the plates over the projections 69 by bolts 75. An assembly of this character allows for freer swinging of the support than can be obtained in the use of axles and journals in the form of turned over ends formed integral with the legs of the support.

The support as shown in Figures 12, 13, and 14 may be adapted for use as a jack as well as to relieve the weight on the steering wheels of a vehicle to facilitate turning of the same; such an attachment may be of the character of the groove blocks shown in Figures 17 and 19, or may consist of an attachment adapted for permanent mounting as shown in Figures 21, 22, and 23, in which the base portion 8 of the support is mounted on a plate 76 in a groove 77 therein and held in place by a plate 78 fitted thereover and secured on the blocks 76 by bolts 79. The plate 76 is normally adapted to act as a bed plate in the same manner as the plate shown in Figure 3, but is provided with a rounded edge 80, as shown in Figure 23, on which is pivoted a bar 81 having an inner rounded edge 82, through links 83 pivoted adjacent the respective ends by pins 84 and 85. The bar 81 is normally adapted to be positioned on the top of the plate 76, as shown in Figure 23, and fixed thereon by catch 86 pivoted on the block 78 by a pin 87. When the bar 81 is thus positioned, the plate 76 is adapted to function in the same manner as the plate 20 shown in Figure 3.

When the bar 81 is positioned under the plate 76, as shown in Figures 21 and in plan as in Figure 23, by pivoting through the links 83, the same is adapted to function to increase the length of the support as shown in Figure 21, and thus act as a jack to fully elevate one end of the vehicle in the same manner as the block shown in Figures 17 and 19. In the use of an attachment of this character, the support is adapted to relieve the weight on the steering wheels of a vehicle to facilitate turning thereof without fully elevating the same as already described, or may be adjusted to act as a jack for completely elevating the wheels for removal or repair thereof.

Another form of arrangement to adapt the support for use as a jack is shown in Figures 24 and 25, although this arrangement is more particularly adapted to provide for adjustment of the length of the support for the purpose of properly positioning the same to relieve the weight on the steering wheels of a vehicle as the same is intended to afford a more or less permanent adjustment.

In this arrangement blocks 88 are substituted for the blocks 13 and 14 shown in Figure 1, and are held on the under side of the axle by lengthened straps 89 in the same manner as the blocks 13 and 14 are held by the straps 15 and 16, shown in Figure 1. Blocks 88 are provided with apertures adapted to receive plugs 90 adapted for rotation therein. The plugs 90 are formed with longitudinal grooves on the peripheries thereof and are fixed against rotation by a plurality of screws 91 fitted in the faces of the blocks 88 having heads 92 thereon adapted to engage in the peripheral grooves on the plugs 90 and prevent rotation thereof with respect to the blocks 88. The plugs 90 are provided with eccentric apertures 93 adapted to act as journals for the turned over ends 11 and 12 of the support legs as shown in Figure 25.

It will thus be seen that by disengaging the heads 91 of the screws 91 from the grooves in the peripheries of the plugs that the same will be rotated with respect to the blocks, and as the axle journals are eccentrically arranged therein, the support may be raised or lowered, and the desired adjustment of the same fixed by engaging the heads 92 of the screws in the peripheral grooves of the plugs at the proper points. In this manner the length of the support may be varied, primarily as aforementioned for the purpose of making a desirable fixed adjustment, although it is manifest that the same is adaptable to provide for the support being lengthened into a jack.

In Figure 26 is shown another form of support on which the end of a vehicle may be elevated on a member contacting with the road surface on a single point only. This support is similar to that shown in Figure 1 and may be attached to the axle of the vehicle in the same manner, except that the legs 9 and 10 are connected at the bottom as shown at 94, and a roller 95 mounted between split ends 96 on an axle 97 fitted therebetween.

The roller which is mounted transversely with respect to the line of travel of a vehicle is adapted to contact with the road surface on a point in a plane with the longitudinal axis of the vehicle and so elevate one end of the vehicle to relieve the weight on the steering wheels thereof, or as to act as a jack, if found desirable. It will be understood that this construction is a modified form of that shown in Figure 1, wherein the peripheral type of support adapted to contact with the road surface across a point in a plane with the longitudinal axis of a vehicle, is shown.

All of the types of supports described herein are adapted to be raised and lowered by any suitable mechanism as shown in my prior applications, by connection of a hand lever with an arm 97 pivoted on a pin 98 formed integral, or suitably connected to one leg of the support. On preparing to drive one end of a vehicle on the support, the same may be lowered for contact with the road surface by operation of such lever, and similarly the support raised when its use is not required, and maintained in a position substantially out of interference with the clearance of the axle.

It will be appreciated that in some instances it may be found desirable to determine the relative position of the support without actually observing its position, in which instance it is, of course, necessary to get out of the vehicle. In order to allow for the operator of a vehicle to determine the relative position of my support, I have devised an indicator whereby the operation of the support may easily be observed from the operating compartment of the vehicle. This support, as shown in Figure 27 consists of a flexible cable 98 enclosed in a conduit 99, having one end provided with a clevis 100, pivoted on an extension 101, and formed on the end of one of the turned over ends 11 of a support leg, and the other end connected to a worm gear 102 as shown in Figure 28, and suitably mounted in an instrument of the character shown in Figure 17, identified by the numeral 103. The worm gear 102 is adapted to mesh with a corresponding gear 103 angularly disposed with respect thereto, and suitably mounted in the instrument case 103, having an axle 104 with a pointer 105 fixed thereon. The pointer is adapted to operate across a dial 106 having suitable indices thereon to indicate the position of the support to the operator.

The operation of this indicator will be readily understood. Movement of the support is transmitted to the pointer 105 through the flexible cable 98, the pointer by the indices on the dial, showing whether the support is fully lowered on the front, or the rear of the axle, or in a raised position.

Another form of indicator instrument is shown in Figure 29 at 20, wherein an electrical arrangement is substituted for the mechanical structure shown in Figures 27 and 28. In this device an arm 107 is mounted on the end of one of the turned over ends 11 of the support. The arm is positioned parallel with the legs of the support, and the end split. A roller 108 operating on an axle 109 is mounted in the split end of the arm. A box 110 is mounted on the under side of the block 113, and a switch mechanism consisting of a movable arm 111 and a stationary arm 112 fixed therein. The movable arm 111 is mounted on a block 113 fixed on the top of the box 110, and the stationary arm 112, is secured on a similar block 114 fixed on the bottom of the box.

The inner ends of the movable and stationary arms are provided with contacts 115 and 116, respectively, and the outer ends are connected to a conductor 117 having a battery 118, and an indicator 119, interposed therein. A block of insulated material 120 is fixed on the end of the movable switch arm 111 adapted to be operated by the roller carried on the arm 107 moving with the support.

The operation of this modified form of indicator will be apparent. The arm 107 carried by the support will describe an arc with movement of the support from a horizontal position through 180°. The roller is adapted to contact with the insulated block 120 fixed on the movable switch arm 115 when the support is vertically positioned. Contact of the roller on the arm 107 with the insulator block 120 will close the circuit between the switch arms and conductor causing the indicator 119 to become energized and so advise the driver in the operating compartment that the support is vertically positioned.

There is accomplished by this invention a support for relieving the weight on the steering wheels of a vehicle to facilitate turning of the same, having attachments therefor capable of compensating for twisting and for sliding movement of the vehicle on elevation of one end thereof and removable and permanent attachments for adapting the support for use as a jack, the support being variously formed either to extend across a point in a plane with the longitudinal axis of a vehicle, or to rest on such a point, with provision for indicating to the driver of the vehicle either electrically or mechanically, the position of the support, while in the operating compartment.

While I have shown and described the preferred embodiment of my invention, I wish it to be understood that I do not confine myself to the precise details of construction herein set by way of illustration, as it is apparent that many changes and variations may be made therein, by those skilled in the art without departing from the spirit of the invention, or exceeding the scope of the appended claims.

I claim:

1. In a device of the character described for a vehicle a support pivoted to the vehicle, a base for the support adapted to contact the roadway, an aperture having sloping sides located in the base, a central groove in the bottom of said aperture, a roller carried by the supports and adapted to lie in the groove at the bottom of the aperture in the base, and means to retain the roller in place within the groove.

2. In a device of the character described for a vehicle a support pivoted to the vehicle, a base for the support adapted to contact the roadway, an aperture having sloping sides located in the base, a central groove in the bottom of said aperture, a roller carried by the supports and adapted to lie in the groove at the bottom of the aperture in the base, and arcuate retaining members cooperating with the supports to hold the roller in said groove.

3. In a device of the character described for a vehicle a support pivoted to the vehicle, a base for the support adapted to contact the roadway, an aperture having sloping sides located in the base, a central groove in the bottom of said aperture, a roller carried by the supports and adapted to lie in the groove at the bottom of the aperture in the base, said supports having a support member which carries the roller with an arcuate top, arcuate retaining members bridging the aperture in the base and bearing against said arcuate top, and means to retain said arcuate retaining members on the base.

4. In a device of the character described for a vehicle a support pivoted to the vehicle, a base for the support adapted to contact the roadway, an aperture having sloping sides located in the base, a central groove in the bottom of said aperture, a roller carried by the supports and adapted to lie in the groove at the bottom of the aperture in the base, said supports having a support member which carries the roller with an arcuate top, arcuate retaining members bridging the aperture in the base and bearing against said arcuate top, and means to retain said arcuate retaining members on the base, said base having a serrated ground engaging portion to minimize slipping.

5. A device of the character described for a vehicle comprising a compression element adapted to be pivoted to the vehicle, a ground engaging element therefor carried at the end of the compression element, roller means on the compression element, a groove in the ground engaging element, said roller means on the compression element fitting within the groove.

6. In a device of the character described for a vehicle, a compression element, a ground engaging element carried on the end of the compression element and having an aperture therein, a series of rollers adapted to lie within the aperture, means at the lower end of the compression element permitting the compression element to roll on the rollers within the aperture in the ground engaging element, and linkage means for holding the rollers in operative position to permit them to reciprocate within the aperture.

JOHN L. BARR.